US007751306B2

(12) United States Patent
Bune

(10) Patent No.: US 7,751,306 B2
(45) Date of Patent: Jul. 6, 2010

(54) MULTI-CARRIER SIGNALS WITH SELECTABLE PILOT PATTERN

(75) Inventor: Paul A. M. Bune, Kornwestheim (DE)

(73) Assignee: Alcatel Lucent, Paris (FR)

( * ) Notice: Subject to any disclaimer, the term of this patent is extended or adjusted under 35 U.S.C. 154(b) by 527 days.

(21) Appl. No.: 11/565,861

(22) Filed: Dec. 1, 2006

(65) Prior Publication Data

US 2007/0127362 A1    Jun. 7, 2007

(30) Foreign Application Priority Data

Dec. 2, 2005  (EP) .................................. 05292576

(51) Int. Cl.
*H04J 11/00* (2006.01)
(52) U.S. Cl. ....................... 370/208; 370/203; 375/259; 375/260
(58) Field of Classification Search ......... 370/203–208; 375/259–260; 455/39, 42, 45
See application file for complete search history.

(56) References Cited

U.S. PATENT DOCUMENTS

| 5,694,389 | A  | * | 12/1997 | Seki et al. ................... 370/208 |
| 6,647,066 | B1 |   | 11/2003 | Szajnowski |
| 6,985,432 | B1 |   | 1/2006  | Hadad |
| 2002/0003774 | A1 | * | 1/2002 | Wang et al. .................. 370/208 |
| 2003/0128656 | A1 | * | 7/2003 | Scarpa ....................... 370/203 |
| 2003/0179776 | A1 | * | 9/2003 | Sumasu et al. ............... 370/491 |
| 2004/0128605 | A1 | * | 7/2004 | Sibecas et al. ............... 714/746 |
| 2005/0008089 | A1 | * | 1/2005 | Bothe et al. .................. 375/261 |
| 2005/0013238 | A1 | * | 1/2005 | Hansen ....................... 370/203 |
| 2005/0190826 | A1 |   | 9/2005  | Van Bruyssel et al. |
| 2007/0211827 | A1 | * | 9/2007 | Baggen et al. ............... 375/316 |

OTHER PUBLICATIONS

Wei Zhang et al, "On pilot pattern design for PSAM-OFDM system", Circuits and Systems, 2004. ISCAS '04, Proceedings of the 2004 International Symposium on Vancouver, BC, Canada, May 23-26, 2004, Piscataway, NJ, USA, IEEE, US, vol. 5, May 23, 2004, pp. 417-420, XP010719552.

* cited by examiner

*Primary Examiner*—William Trost, IV
*Assistant Examiner*—Charles C Jiang
(74) *Attorney, Agent, or Firm*—Fay Sharpe LLP

(57) ABSTRACT

Embodiments of the invention relate to a method of generating digital multi-carrier frequency division multiplexing (FDM) signals, the signals comprising FDM symbols having pilot symbols, wherein at least one FDM symbol has pilot symbols which are non-equidistantly spaced in frequency. Other embodiments of the invention relate to a method of processing multi-carrier frequency division multiplexing (FDM) signals, the method comprising the following steps:
  a) demodulating digital multi-carrier FDM signals, said signals being comprised of FDM symbols having pilot symbols, the pilot symbols of at least one FDM symbol being non-equidistantly spaced in frequency,
  b) replacing, on a sub-carrier basis, at least one data symbol with a pilot symbol, whereby the replacement yields a spacing of pilot symbols which is equidistant in frequency for all FDM symbols.

12 Claims, 6 Drawing Sheets

MULTI-CARRIER SIGNALS WITH SELECTABLE PILOT PATTERN

The invention is based on a priority application EP 05 292 576.5 which is hereby incorporated by reference.

FIELD OF THE INVENTION

Telecommunication systems using multi-carrier transmission are well known. They use a multitude of electromagnetic carrier waves, also called sub-carriers, to transmit information. Examples are digital subscriber line (DSL) modems or systems operating according to the digital audio broadcasting standard (DAB). In these examples the transmission is based on orthogonal frequency division multiplexing (OFDM).

BACKGROUND OF THE INVENTION

Recently it has been discussed to use multi-carrier telecommunication systems for cellular mobile radio communication. As in all cellular telecommunication systems this brings the focus to the problem of interference. Since in a cellular system resources like frequencies or codes are reused in some distance, signal reception may be distorted by interference.

SUMMARY OF THE INVENTION

Taking this related art into account an object of embodiments of the invention is to provide methods of generating and processing multi-carrier signals, whereby these signals have a degree of freedom which can be reused in some distance in a cellular telecommunication system.

This object is solved by the features of the independent claims. Further embodiments of the claimed invention are described by the features of the sub-claims.

A first aspect of the invention relates to a method of generating digital multi-carrier frequency division multiplexing (FDM) signals. The signals comprise FDM symbols having pilot symbols. At least one FDM symbol has pilot symbols which are non-equidistantly spaced in frequency.

Within this description a sub-carrier shall be understood to be an electromagnetic wave having a frequency within a certain frequency band. Each sub-carrier is used to transmit information to a user in units called symbols. The sub-carriers have different frequencies and the telecommunication system is a frequency division multiplexing (FDM) system, e.g. an OFDM system. The symbols which relate to user information, e.g. user data such as text data or speech data, are called data symbols. Further information needed by the system for a proper transmission of information is contained in pilot symbols, often abbreviated "pilots". Pilot symbols are used by multi-carrier systems for carrying out a channel estimation, a process which determines the channel transfer function of the wanted signal. With the help of the channel transfer function the transmitted information can be derived from the received signal.

The arrangement of pilot symbols and data symbols within a multi-carrier signal is governed by a time frequency map, herein abbreviated TF map. A TF map defines the position of data symbols and pilot symbols in time and frequency. The frequency is the frequency of the sub-carriers which is in many cases determined by a norm or industry standard. The transmission time is subdivided in time slots of fixed length, e.g. 2 ms in the case of OFDM. A time slot, also called TTI (transmission time interval) in the case of OFDM is used to transmit data symbols as well as pilot symbols. A non-equidistant spacing in frequency then means that the associated FDM symbol, e.g. OFDM symbol, has a variable number of data symbols between two (neighbouring) pilot symbols. Likewise, there is a variable number of sub-carriers between the two sub-carriers which carry pilot symbols.

The method of said first aspect of the invention provides multi-carrier signals having a selectable pilot pattern. The pilot pattern actually chosen for transmission depends on the requirements of the multi-carrier telecommunication system. The method may enable the provision of different pilot patterns for different cells of such a system. The pilot pattern then represents a degree of freedom which can be reused by the cellular telecommunication system in some distance. As a general rule two cells of a cellular telecommunication system can use the same pilot pattern when they are too remote from each other such that signals originating from these two cells show a negligible interference only. This degree of freedom can be used to distinguish signals with the help of their pilot patterns.

Another embodiment suggests that all FDM symbols show a non-equidistant spacing of their pilot symbols. It is also possible that all FDM symbols show the same non-equidistant spacing of their pilot symbols.

If desired, the FDM system may be an OFDM system, such that the signals are OFDM signals. This facilitates the use of OFDM for cellular mobile radio communication.

The generated multi-carrier signal is a digital signal. For transmission over the air interface it is modulated, and is converted into an analogue signal. The analogue signal is then transmitted by an antenna over the air.

Another aspect of the invention relates to a method of processing multi-carrier frequency division multiplexing (FDM) signals. In a first step digital multi-carrier FDM signals are demodulated. Said signals are comprised of FDM symbols having pilot symbols, the pilot symbols of at least one FDM symbol being non-equidistantly spaced in frequency. The signal to be processed thus has a first pattern of pilot symbols. In a second step at least one data symbol is replaced, on a sub-carrier basis with a pilot symbol, whereby the replacement yields a spacing of pilot symbols which is equidistant in frequency for all FDM symbols.

This replacement is done in the receiver portion of the device which receives the signals. This device may be a base station, an access point, a terminal device, e.g. a mobile terminal device, such as a mobile phone, a laptop, a notebook, a portable digital assistant (PDA) or any other suitable electronic device having an antenna and an electronic logic and to be able to process such multi-carrier-signals, e.g. OFDM signals. As the signal is already present in the device, the replacement does not mean that information, namely the replaced data symbol, is lost. The data symbol will generally be stored elsewhere in the device, e.g. into a RAM (random access memory), for data reconstruction.

The replacement yields multi-carrier signals having a second pilot pattern. The second pilot pattern can be chosen to be suitable for the computer software of hardware which is used to carry out a further processing of the signals, in particular channel estimation and data demodulation. For example, the second pilot pattern allows using a FFT (fast fourier transformation) channel estimation to derive the channel impulse response of the multi-carrier signals. A direct channel estimation of signals with the first pilot pattern, i.e. of signals with a variable spacing of pilot symbols in FDM symbols, cannot be done with a FFT channel estimator, as this type of channel estimator puts rigid requirements on the pilot patterns. In particular, a FFT channel estimator requires fixed distances between the pilot symbols on a sub-carrier.

In another embodiment the multi-carrier signals which are processed as discussed above are OFDM signals. The above embodiment then facilitates the reception of OFDM signals with different pilot patterns, whereby the pilot pattern can be chosen to identify the origin of the signal source and to distinguish these signals with the help of their pilot patterns. As an example, the cellular telecommunication system may have individual pilot patterns for their cells, whereby a pilot pattern can be reused in some distance. A "reuse" should mean that the operator of the telecommunication system, e.g. a wireless cellular system, can attribute the same pilot pattern to two cells A and B, if these two cells are sufficiently far away from each other. This is generally the case when a device, e.g. a mobile phone, is not likely to receive signals from cell A as well as from cell B at the same location.

The replacement mentioned above can be carried out in at least two ways. One possibility is copying a pilot symbol into a data symbol. Another possibility is to carry out an interpolation, e.g. a linear interpolation.

In a further embodiment the method comprises the step of providing a DC sub-carrier with pilot symbols by means of interpolation, e.g. linear interpolation. The DC sub-carrier is, per definition, not usable for transmitting information or pilot symbols, but it can be used when processing the received multi-carrier FDM signals, e.g. OFDM signals. The interpolation may use two pilot symbols of the same or adjacent FDM symbols to generate a new pilot symbol in an OFDM symbol. This interpolation is more accurate when the frequency of these two pilot symbols are close to the frequency of the DC sub-carrier.

Generating pilot symbols on the DC sub-carrier increases the number of available pilot symbols and improves the accuracy of the channel estimation. This pilot symbol generation is carried out internal to the receiver portion of the corresponding device receiving the multi-carrier signal. These additional pilot symbols can thus be regarded to be virtual pilot symbols in contrast to real (i.e. actually transmitted) pilot symbols.

In another embodiment the method comprises the step of carrying out a channel estimation and a demodulation of the sub-carriers. The channel estimation may be an FFT channel estimation, and the demodulation of the sub-carriers may be a QAM or QPSK demodulation.

Another aspect of the invention relates to the signal created with the method of generating multi-carrier FDM signal. It thus relates to a multi-carrier FDM signal, in particular an OFDM signal, the signal comprising FDM symbols having pilot symbols, wherein at least one FDM symbol has pilot symbols which are non-equidistantly spaced in frequency.

The present invention can be realized in hardware, software, or a combination of hardware and software. Any kind of computer system—or other apparatus adapted for carrying out the methods described herein—is suited. A typical combination of hardware and software could be a digital signalling processor (DSP) with a computer program that, when being loaded and executed, controls the DSP such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

These and other aspects of the claimed invention will be apparent from and elucidated with reference to the embodiments described thereafter. It should be noted that the use of reference signs shall not be construed as limiting the scope of the invention.

DETAILED DESCRIPTION OF THE INVENTION

Figure 1:
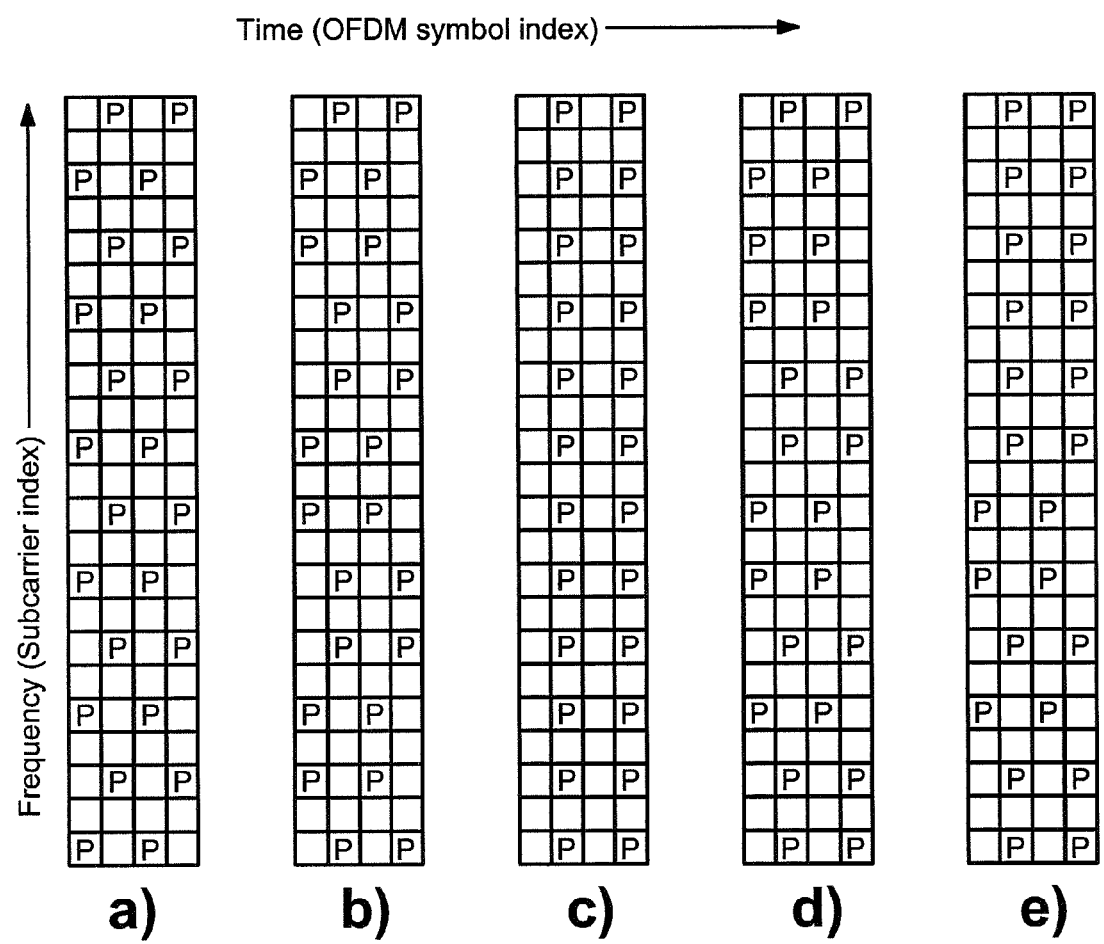
FIG. 1 shows examples of simplified TF maps with different pilot patterns for the transmission of OFDM signals by a transmitter.

FIG. 1 shows simplified TF maps 1a) . . . 1e) with different pilot patterns for the transmission of OFDM signals by a transmitter. In each TF map the time is plotted in units of TTIs along the horizontal axis, and the sub-carrier index, representing the sub-carrier frequency, is plotted along the vertical axis. For simplicity the horizontal axis is subdivided into four TTIs only, and the vertical axis is subdivided in only 23 frequency indexes. Each TF map thus contains only four OFDM symbols. The man skilled in the art will easily derive that this TF map is a simplified TF map, as an OFDM TF map contains more sub-carriers. The simplification is chosen for an easier understanding of the embodiments.

FIG. 1a) is a TF map with a pilot pattern suitable for FFT channel estimation within an OFDM receiver. Each OFDM symbol contains six pilot symbols denoted by "P". All other boxes in this TF map are filled by data symbols. The pilot symbols of each OFDM symbol are equidistantly spaced in frequency. Correspondingly, there is always the same number of data symbols between two neighbouring pilot symbols. In the case of FIG. 1a) there are always three data symbols (blank boxes) between two pilot symbols. This is also the case for the bottom part of the second and the fourth OFDM symbol, as the TF map is truncated at the bottom for the above-mentioned reason of simplicity.

FIG. 1b) . . . 1e) are TF maps with pilot patterns in which the pilot symbols are non-equidistantly spaced in frequency. These are only a few examples of the many variants which exist. The man skilled in the art will easily derive that there are many other possible pilot patterns with pilot symbols being non-equidistantly spaced in frequency.

In FIG. 1b) the first OFDM symbols contains 6 pilot symbols, whereby there are either 1 or 5 data symbols between two pilot symbols. The same is true for the other three OFDM symbols.

FIG. 1c) has an equidistant spacing of pilot symbols in the second and fourth OFDM symbol, but has no pilot symbols in the first and third OFDM signal.

FIG. 1d) has, for each OFDM symbol, 6 pilot symbols with 1, 3 or 5 data symbols between two (neighbouring) pilot symbols. Each OFDM symbol has the same pattern of pilot symbols, but with a frequency offset.

FIG. 1e) has either 1, 3 or 5 data symbols between two pilot symbols associated with an OFDM symbol. Again, each OFDM symbol has the same pattern of pilot symbols, but with a frequency offset. In the lower part the TF map of FIG. 1e) is identical to the TF map of FIG. 1d), but there are differences in the upper part.

A transmitter, e.g. a terminal device such as a mobile phone, transmits FDM signals, e.g. OFDM signals, with pilot patterns according to FIG. 1b), 1c) 1d) or 1e) or any other pilot pattern in which the pilot symbols "P" are non-equidistantly spaced in frequency for at least one FDM symbol. In practical terms the individual sub-carriers are modulated first. This step is called single carrier modulation. Then an encoder generates data symbols, e.g. QAM symbols if QAM modulation is chosen, or QPSK modulation, if QPSK modulation is chosen. Then the FDM symbols are generated on the basis of a TF map, e.g. the TF map according to any of the TF maps of FIG. 1b) to FIG. 1e), whereby pilot symbols are inserted. Finally, the signals which comprise the FDM symbols are modulated. The last step is called multi-carrier modulation.

The result is a digital multi-carrier signal. A transmitter converts this digital multi-carrier signal into an analogue signals by means of an digital-to-analogue converter, and uses its antenna to transmit the analogue signal over the air. Another device having an electronic receiver, receives the signal with the help of an antenna, and converts the analogue signal into a digital signal by means of an analogue-to-digital converter. The digital multi-carrier signal it has received has a first pilot pattern. The first pilot pattern is characterized by a non-equidistant spacing of pilot symbols in at least one FDM symbol. The pilot pattern might be a pilot pattern according to FIG. 1b) . . . FIG. 1e).

The receiver then processes the signals having the first pilot pattern. This processing comprises replacing, on a sub-carrier basis, at least one data symbol with a pilot symbol. In this way the replacement yields a second pilot pattern with a spacing of pilot symbols which is equidistant in frequency for all FDM symbols. The second pilot pattern may be the pilot pattern shown in FIG. 1a).

The multi-carrier signal having the second pilot pattern can then be used to carry out a channel estimation with a FFT channel estimator, and to carry out a single carrier demodulation to derive the information carried by the signal.

In practical cases the receiver receives signals of different signal sources within the cellular telecommunication system. Each cell may be associated with an individual pilot pattern, which, according to the embodiments described above, are transferred into a second pilot pattern with an equidistant spacing of pilot symbols in the FDM symbols. The above methods provide a large multitude of pilot patterns which can be used for that purpose.

Figure 2:
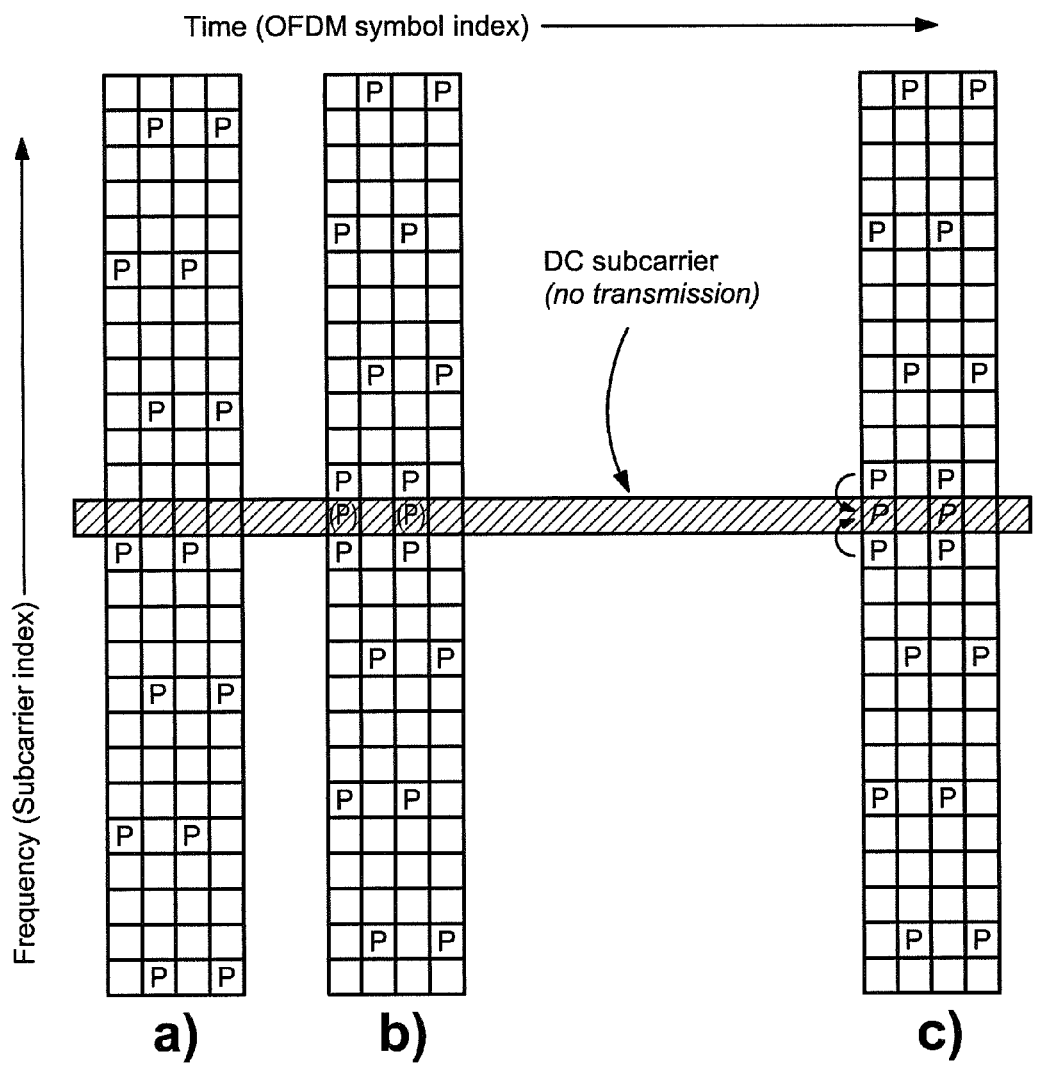
FIG. 2 shows the creation of virtual pilot symbols on the DC sub-carrier within a receiver of OFDM signals, FIG. 3 the creation of a new pilot pattern within an OFDM receiver.

FIG. 2a-c show that the above embodiments may use pilot patterns with virtual, i.e. non-transmitted, pilot symbols on a DC sub-carrier. In FIG. 2a) there are pilot symbols around the DC sub-carrier which are equidistantly spaced in frequency.

FIG. 2b) shows the same pilot symbol pattern as in FIG. 2a), but shifted upwards by one sub-carrier. To maintain equidistant spacing between the pilot symbols, pilots should be placed on the DC sub-carrier as indicated by "(P)". However, it is not possible to transmit pilot symbols "(P)" as the DC sub-carrier shall not be used for transmission. Instead, pilot symbols on the DC sub-carrier are derived by interpolation, e.g. linear interpolation, from additional pilot symbols above and below the DC sub carrier. The way in which this is done is shown in FIG. 2c). In FIG. 2c) two pilot symbols are used for interpolating one pilot symbol on the DC sub-carrier. The TF map shown is an exemplary and simplified TF map for sake of clarity.

Figure 3:
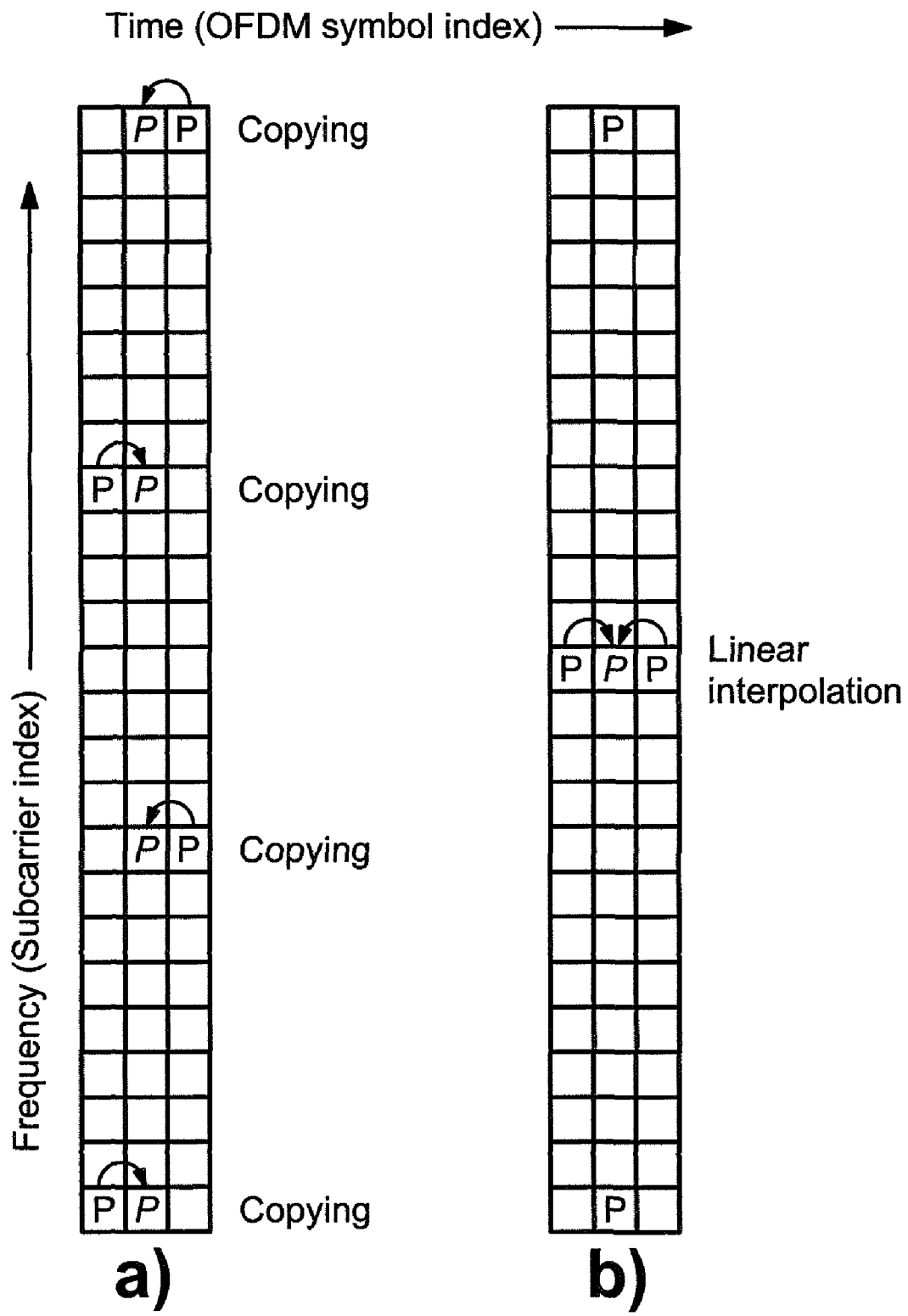

FIG. 3a) and 3b) illustrate the processing of the multi-carrier FDM signals in a receiver in more detail. FIG. 3a) shows a copying of pilot symbols of the first and third OFDM symbol into the second OFDM symbol. The result is a second OFDM symbol with a spacing of pilot symbols which is equidistant in frequency.

FIG. 3b) shows the creation of a new pilot symbol in the second OFDM symbol by means of interpolation. This interpolation is carried out on a sub-carrier basis. This means that the two pilot symbols, which are used for the interpolation, belong to the same sub-carrier as the new pilot symbol.

Figure 4:
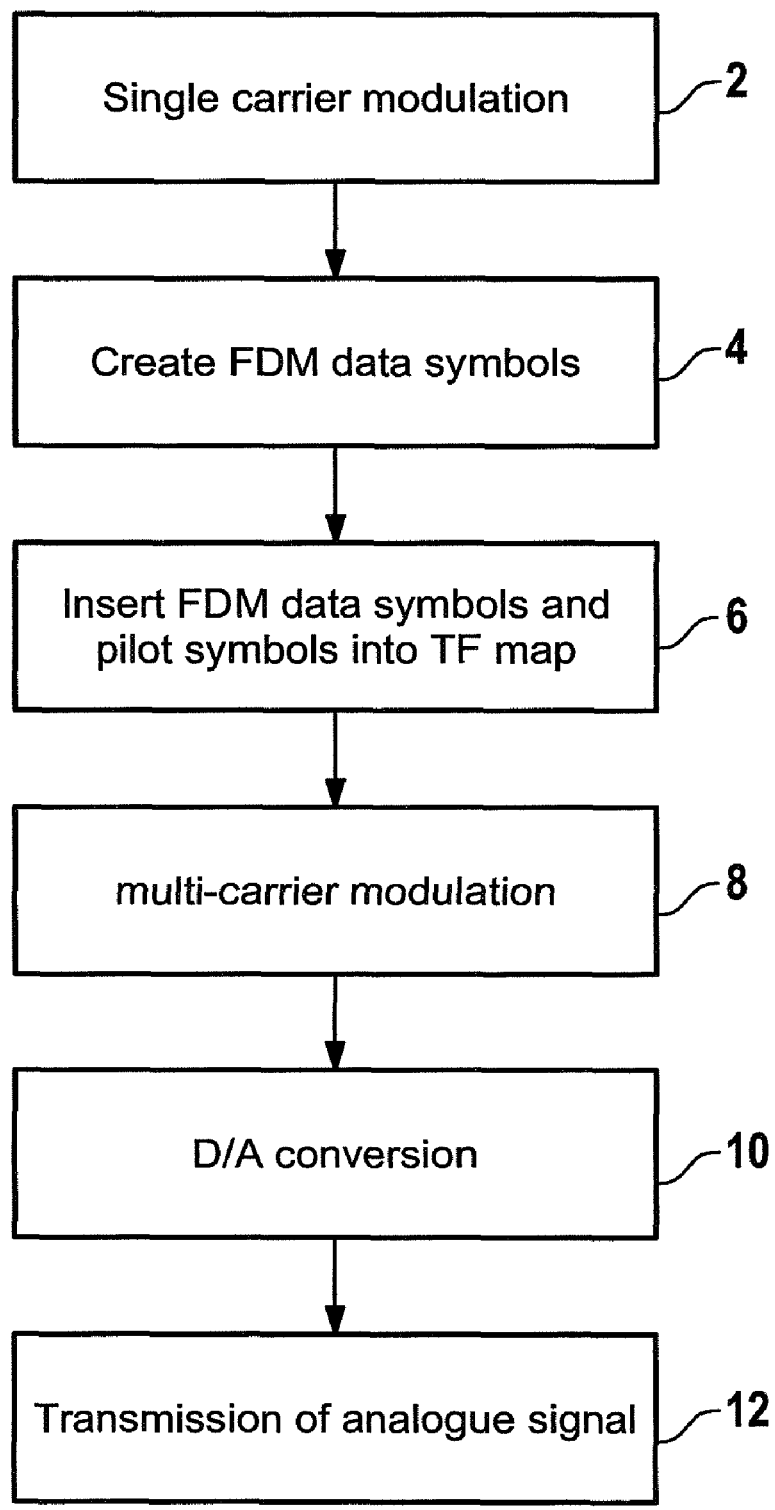
FIG. 4 is a flowchart illustrating the transmission of signals.

FIG. 4 shows a flowchart illustrating the transmission of signals according to embodiments described above. In step 2 a modulation, e.g. a QAM or QPSK modulation of the individual sub-carriers, of which a FDM signal, e.g. an OFDM signal is composed of, is carried out. In step 4 data symbols are generated. In step 6 the data symbols and pilot symbols are inserted into a TF map. The TF map may be a TF map according to FIG. 1b) to 1e), hence they show a non-equidistant spacing (in frequency) of pilot symbols within a FDM symbol. The result is a multitude of FDM symbols. In step 8 the FDM symbols are modulated. In step 10 the digital modulated multi-carrier signal is converted into an analogue signal by means of a digital to analogue (D/A) converter. In step 12 the analogue signal is transmitted over the air in the cellular telecommunication network.

Figure 5:
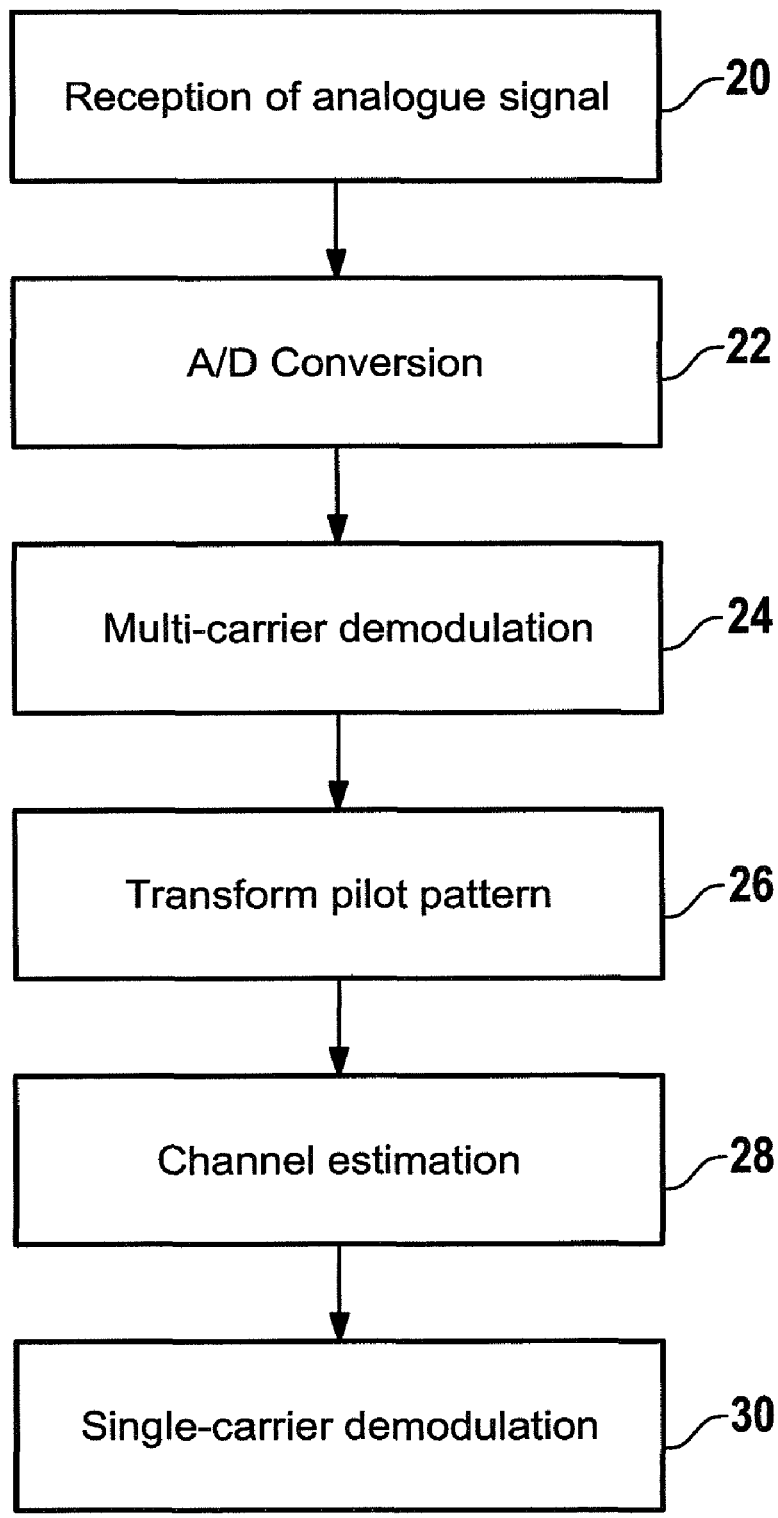
FIG. 5 is a flowchart illustrating the reception of signals.

The steps of the flowchart of FIG. 4 are carried out by a transmitter. A receiver receives these signals and processes them. This is illustrated by the flowchart of FIG. 5.

In step 20 the analogue signal is received with an antenna. In step 22 the analogue signal is converted into a digital signal by means of an analogue-to-digital (A/D) converter. In step 24 the multi-carrier signal is demodulated, whereby the multi-carrier signal is based on a TF map having an a non-equidistant spacing (in frequency) of pilot symbols within a FDM symbol as in FIG. 1b) to 1e). In step 26 the pilot pattern is transformed into a second pilot pattern. In the second pilot pattern there is an equidistant spacing (in frequency) of pilot symbols within a FDM symbol as it is the case in FIG. 1a). In step 28 a FFT channel estimation is carried out. In step 30 the single carrier demodulation is carried out with the channel estimation obtained in step 28.

Figure 6:
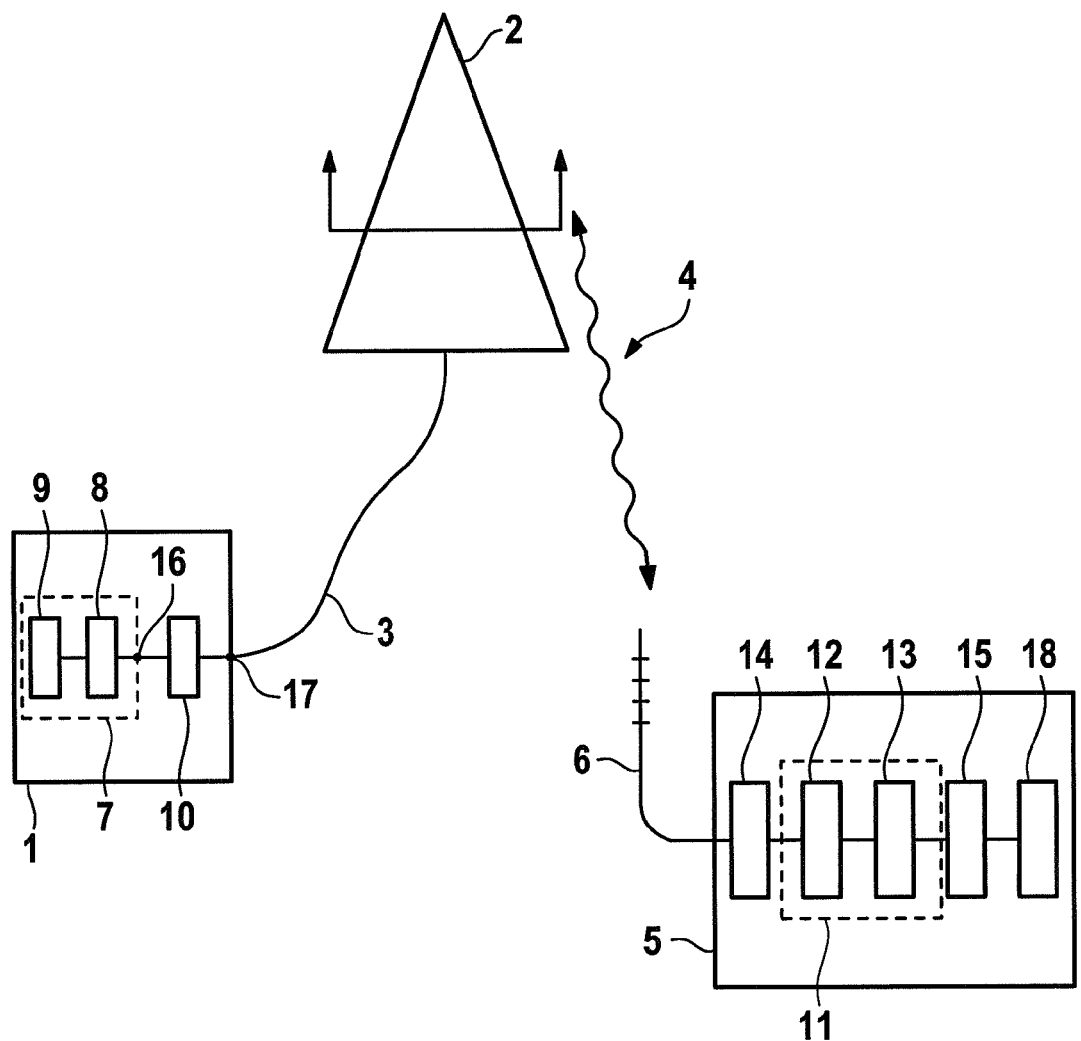
FIG. 6 shows a base station and a terminal device of a cellular telecommunication system.

FIG. 6 shows the devices for carrying out the method explained above. A base station 1 is connected to an antenna 2 by a cable 3. The base station 1 exchanges OFDM signals 4 with a terminal device 5 having an antenna 6. The base station services a multitude of users in a cellular telecommunication network (not shown).

Base station 1 has a digital generator 7 for OFDM signals 4. The digital generator 7 comprises an electronic circuit 8 and a random access memory (RAM) 9. The electronic circuit 8 may be a DSP, an FPGA or any type of microprocessor using the RAM 9 for running a computer program. A D/A converter 10 is used to generate an analogue signal which can be transmitted over the air by the help of antenna 2.

Terminal device 5 receives the transmitted OFDM signal 4 with the help of its antenna 6. Terminal device 5 has a digital receiver 11 which comprises a multi-carrier demodulator 12 and a signal modification unit 13. Digital receiver 11 gets digital signals from A/D converter 14 converting the analogue OFDM signals 4 detected by antenna 6. As will be described below in more detail, the multi-carrier demodulator 12 demodulates a signal having a non-equidistant spacing of pilot symbols within at least one OFDM symbol. The OFDM signals with this first pilot pattern is modified by the signal modification unit 13. The signal modification unit 13 modifies the pilot pattern and generates OFDM signals with an equidistant spacing of pilot symbols within all OFDM symbols.

As a matter of fact a base station 1 in a wireless cellular telecommunication network may not only be adapted to generate OFDM signals 4 by means of a digital generator 7, but may also adapted to receive such signals by a digital receiver 11. The same applies mutatis mutandis for the terminal device 5, such that FIG. 6 is a simplified figure which only illustrates the flow of signals from base station 1 to terminal device 5.

LIST OF REFERENCE NUMERALS 01 base station
02 antenna
03 cable
04 OFDM signal
05 terminal device
06 antenna
07 digital generator
08 electronic circuit
09 RAM
10 D/A converter
11 digital receiver
12 demodulator
13 signal modification unit
14 A/D converter
15 channel estimator
16 output port
17 output port
18 demodulation unit

The invention claimed is:

1. A method of processing multi-carrier frequency division multiplexing signals received in a terminal device, the method comprising the following steps:
    a) demodulating digital multi-carrier FDM signals, said signals being comprised of FDM symbols having pilot symbols, the pilot symbols of at least one FDM symbol being non-equidistantly spaced in frequency,
    b) replacing, on a sub-carrier basis, in the terminal device, at least one data symbol with a pilot symbol of the FDM symbols, whereby the replacement yields a spacing of pilot symbols which is equidistant in frequency for all FDM symbols, wherein replacing a data symbol is done by copying a pilot symbol into the data symbol.

2. The method according to claim 1, wherein the signals are OFDM signals.

3. The method according to claim 1, wherein replacing a data symbol is done by interpolation.

4. The method according to claim 1, further comprising the steps of carrying out a channel estimation and a demodulation of the sub-carriers.

5. A computer readable medium, that stores a computer program product comprising computer readable program means for causing a computer to perform a method according to claim 1 when said program is run on said computer.

6. A method of processing multi-carrier frequency division multiplexing signals received in a terminal device, the method comprising the following steps:
    a) demodulating digital multi-carrier FDM signals, said signals being comprised of FDM symbols having pilot symbols, the pilot symbols of at least one FDM symbol being non-equidistantly spaced in frequency,
    b) replacing, on a sub-carrier basis, in the terminal device, at least one data symbol with a pilot symbol of the FDM symbols, whereby the replacement yields a spacing of pilot symbols which is equidistant in frequency for all FDM symbols, further comprising the step of providing pilot symbols on a DC sub-carrier by means of interpolation.

7. The method according to claim 6, wherein the signals are OFDM signals.

8. The method according to claim 6, wherein replacing a data symbol is done by interpolation.

9. The method according to claim 6, further comprising the steps of carrying out a channel estimation and a demodulation of the sub-carriers.

10. A computer readable medium, that stores a computer program product comprising computer readable program means for causing a computer to perform a method according to claim 6 when said program is run on said computer.

11. A method of processing multi-carrier frequency division multiplexing signals received in a terminal device, the method comprising the following steps:
    a) demodulating in the terminal device digital multi-carrier FDM signals, said signals being comprised of FDM symbols having pilot symbols, the pilot symbols of at least one FDM symbol being non-equidistantly spaced in frequency,
    b) replacing, on a sub-carrier basis in the terminal device, at least one data symbol with a pilot symbol of the FDM symbols, whereby the replacement yields a spacing of pilot symbols which is equidistant in frequency for all FDM symbols, wherein replacing a data symbol is done by copying a pilot symbol into the data symbol.

12. The method of claim 11 further comprising: providing pilot symbols on a DC sub-carrier by means of interpolation.

* * * * *